(12) United States Patent
Nicolaescu et al.

(10) Patent No.: US 7,146,068 B2
(45) Date of Patent: Dec. 5, 2006

(54) POLARIZATION INSENSITIVE METHOD AND APPARATUS FOR SWITCHING AND MODULATING AN OPTICAL BEAM

(75) Inventors: Remus Nicolaescu, San Francisco, CA (US); Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/293,717

(22) Filed: Dec. 1, 2005

(65) Prior Publication Data

US 2006/0083457 A1    Apr. 20, 2006

Related U.S. Application Data

(60) Division of application No. 10/603,379, filed on Jun. 24, 2003, now Pat. No. 6,999,664, which is a continuation-in-part of application No. 10/162,826, filed on Jun. 4, 2002, now Pat. No. 7,013,070.

(51) Int. Cl.
    *G02B 6/26* (2006.01)
(52) U.S. Cl. .................................. 385/16; 385/8
(58) Field of Classification Search ............ 385/16
    See application file for complete search history.

(56) References Cited

U.S. PATENT DOCUMENTS

| 3,957,341 A | 5/1976 | Taylor |
| 3,976,358 A | 8/1976 | Thompson |
| 4,082,419 A | 4/1978 | Thompson et al. |
| 4,787,691 A | 11/1988 | Lorenzo et al. |
| 4,869,569 A | 9/1989 | Kapon |
| 5,125,065 A | 6/1992 | Stoll et al. |
| 5,159,699 A | 10/1992 | de Monts |
| 5,347,601 A | 9/1994 | Ade et al. |
| 5,481,636 A | 1/1996 | Fukuda et al. |
| 5,502,781 A | 3/1996 | Li et al. |
| 5,862,276 A | 1/1999 | Karras |
| 5,908,305 A | 6/1999 | Crampton et al. |
| 6,002,823 A | 12/1999 | Chandross et al. |
| 6,144,779 A | 11/2000 | Binkley et al. |
| 6,253,000 B1 | 6/2001 | Madsen et al. |
| 6,292,597 B1 | 9/2001 | Lagali et al. |

(Continued)

FOREIGN PATENT DOCUMENTS

WO    WO 00/72064 A1    11/2000

OTHER PUBLICATIONS

PCT/US03/15387, PCT Search Report, Oct. 1, 2003.

(Continued)

*Primary Examiner*—Brian Healy
*Assistant Examiner*—James P. Hughes
(74) *Attorney, Agent, or Firm*—Blakely, Sokoloff, Taylor & Zafman LLP

(57) ABSTRACT

A polarization beam splitter and combiner and a polarization insensitive modulating and switching method and apparatus. In one aspect of the present invention, the disclosed apparatus a first optical waveguide disposed in a semiconductor material layer. A second optical waveguide is also disposed in the semiconductor material layer. An insulating region is disposed between the first and second optical waveguides to provide a coupling region in the semiconductor material layer between the first and second optical waveguides. The coupling region has a first coupling length for a first polarization mode of an optical beam directed through one of the first and second optical waveguides into the coupling region. The coupling region has a second coupling length for a second polarization mode of the optical beam.

6 Claims, 6 Drawing Sheets

U.S. PATENT DOCUMENTS

| | | |
|---|---|---|
| 6,545,791 B1 | 4/2003 | McCaughan et al. |
| 2002/0025103 A1 | 2/2002 | Thaniyavarn |
| 2002/0131712 A1 | 9/2002 | Markwardt et al. |
| 2004/0101227 A1* | 5/2004 | Takabayashi et al. ......... 385/11 |

OTHER PUBLICATIONS

PCT/US03/15387, PCT Written Opinion, May 23, 2005.

Padmanabhan, K. et al., "Dilated Networks for Photonic Switching," IEEE Transactions on Communications, vol. COM-35, No. 12, Dec. 1987, pp. 1357-1365.

Soref, R. A. et al., "Vertically Integrated Silicon-on-Insulator Waveguides," IEEE Photonics Technology Letters, vol. 3, No. 1, Jan. 1991, pp. 22-24.

Bachmann, M. et al., "General Self-imaging Properties in N×N Multimode Interference Couplers Including Phase Relations," Applied Optics, vol. 33, No. 18, Jun. 20, 1994, pp. 3905-3911.

Soldano, L. B. et al., "Optical Multi-Mode Interference Devices Based on Self-Imaging: Principles and Applications," Journal of Lightwave Technolgoy, vol. 13, No. 4, Apr. 1995, pp. 615-627.

Rasmussen, T. et al., "Design and Performance Evaluation of 1-by-64 Multimode Interference Power Splitter for Optical Communications," Journal of Lightwave Technology, vol. 13, No. 10, Oct. 1995, pp. 2069-2074.

Smit, M. K. et al., "PHASAR-Based WDM-Devices: Principles, Design and Applications," IEEE Journal of Selected Topics in Quantum Electronics, vol. 2, No. 2, Jun. 1996, pp. 236-250.

Rajarajan, M. et al., "Accurate analysis of MMI Devices with Two-Dimensional Confinement," Journal of Lightwave Technology, vol. 14, No. 9, Sep. 1996, pp. 2078-284.

Kareenahalli, S. et al., "Experimental Confirmation of Phase Relationships of Multimode Interference Splitters Using a Shearing-Type Near-Field Sagnac Interferometer," IEEE Photonics Technology Letters, vol. 9, Jul. 1997, pp. 937-939.

Lorenzo, R. M. et al., "Improved Self-Imaging Characteristics in 1×N Multimode Couplers," IEEE Proc.-Optoelectron, vol. 145, No. 1, Feb. 1998, pp. 65-69.

* cited by examiner

POLARIZATION INSENSITIVE METHOD AND APPARATUS FOR SWITCHING AND MODULATING AN OPTICAL BEAM

CROSS-REFERENCE TO RELATED APPLICATIONS

This application is a divisional of U.S. patent application Ser. No. 10/603,379, filed Jun. 24, 2003 now U.S. Pat. No. 6,999,664, which is a continuation-in-part of U.S. patent application Ser. No. 10/162,826, filed Jun. 4, 2002 now U.S. Pat. No. 7,013,070.

BACKGROUND OF THE INVENTION

1. Field of the Invention

The present invention relates generally to optical signals and, more specifically, the present invention relates to polarization insensitive modulation and switching of optical signals.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Commonly found types of optical switches are mechanical switching devices, thermal switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

Thermal switching devices rely on a temperature-induced change of the refractive index to switch the light. This approach is popular because almost all materials exhibit this behavior. The disadvantage for them is the time it takes to warm and cool the devices to get them to switch. Typical times are on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate (LiNbO3).

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for splitting and combining polarization modes of an optical beam as well as polarization insensitive modulation and switching of optical beams in a semiconductor material are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical device is provided in a fully integrated solution on a single integrated circuit chip. In one embodiment, the optical device may be employed as a polarization beam splitter to separate for example the transverse magnetic field (TM) mode polarization component of an unpolarized optical beam from the transverse electric field (TE) mode polarization component of the unpolarized optical beam. As can be appreciated by those skilled in the art, the TM mode is sometimes referred to as the vertical polarization state and the TE mode is sometimes referred to as the horizontal polarization state. The optical beam may propagate bi-directionally through this optical device, and therefore, the optical device further serves as a polarization beam combiner to combine the TM mode and TE mode polarization components of the optical beam. Embodiments of the polarization beam splitter/combiner may be used as building blocks for a variety of high bandwidth applications including multi-processor, telecommunications, networking or the like. For example, as will be discussed, embodiments of polarization beam splitters/combiners may be employed in a polarization insensitive optical modulator as well as a polarization insensitive 1×2 optical switch in accordance with the teachings of the present invention.

Figure 1:
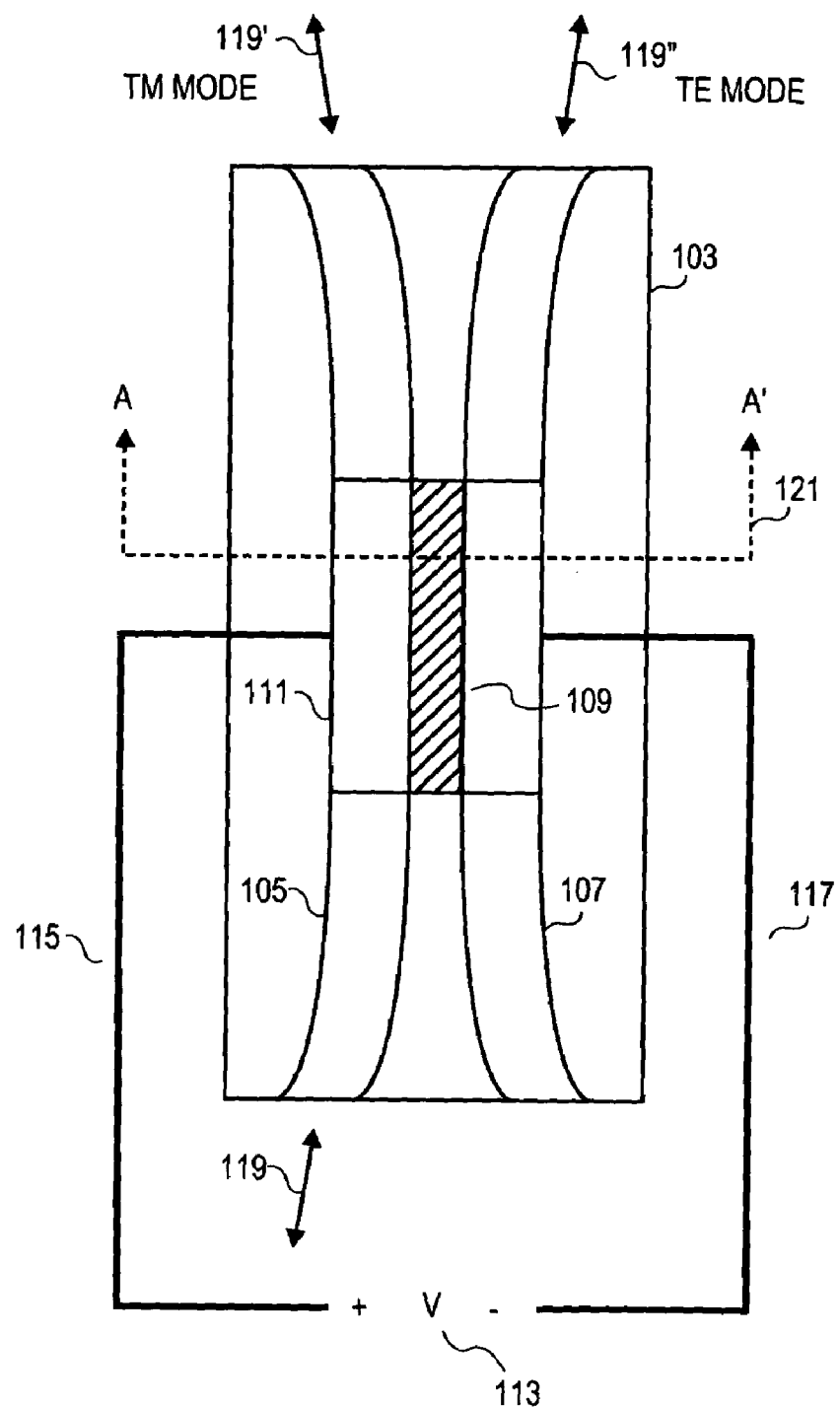
FIG. 1 is a top view diagram of one embodiment of a polarization beam splitter/combiner in accordance with the teachings of the present invention.

FIG. 1 is a block diagram illustrating one embodiment of an optical device 101 in accordance with the teachings of the present invention. As shown in the depicted embodiment, optical device 101 includes a semiconductor material layer 103 in which a first optical waveguide 105 and a second optical waveguide 107 are disposed. In one embodiment, semiconductor material layer 103 includes silicon, polysilicon or another suitable semiconductor material such as for example but not limited to III–V semiconductor materials. In one embodiment, first and second waveguides 105 and 107 are single mode waveguides. An insulating region 109 is disposed in semiconductor material layer 103 between first and second optical waveguides 105 and 107 in a coupling region 111 of optical device 101. In one embodiment, insulating region 109 includes an oxide, such as for example silicon oxide, to isolate first optical waveguide 105 from second optical waveguide 107.

In operation, an optical beam 119, including for example unpolarized light, is launched or directed into first waveguide 105. When optical beam 119 propagates into coupling region 111, evanescent coupling occurs between first and second optical waveguides 105 and 107 across insulating region 109. In accordance with the teachings of the present invention, the coupling strength between the adjacent or neighboring first and second optical waveguides 105 and 107 varies depending on the polarization of the optical beam. Therefore, in one embodiment, the coupling length between optical waveguides 105 and 107 is dramatically different for the TM mode component than the coupling length for the TE mode component.

By appropriately choosing the length of the coupling region 111, a very small polarization beam splitter may therefore be constructed to separate out the TM and TE modes of an unpolarized optical beam. For example, in one embodiment, a polarization beam splitter has a coupling region that is only 300 μm long. This polarization beam splitter aspect of the present invention is illustrated in FIG. 1 with the TM mode polarization component 119' of optical beam 119 being directed out from coupling region 111 through optical waveguide 105. Furthermore, the TE mode polarization component 119" of optical beam 119 is directed out from coupling region 111 through optical waveguide 107.

As illustrated in the embodiment of FIG. 1, when light propagates in the opposite direction, optical device 101 functions also as a polarization beam combiner. As shown for example, the TM mode polarization component 119' is directed through optical waveguide 105 into coupling region 111 and the TE mode polarization component 119" is directed through optical waveguide 105 into coupling region 111. The appropriately chosen length of the coupling region 111 results in the evanescent coupling of the TM and TE modes to be combined into the unpolarized optical beam 119, which in the illustrated embodiment is directed out from the coupling region 111 through optical waveguide 105.

In one embodiment, an optional voltage V 113 may be applied to coupling region 111 to form a layer of charge proximate to the insulating region 109. In one embodiment, this charge layer will help control the coupling strength between optical waveguides 105 and 107 in the coupling region 111. In one embodiment, this charge layer formed with voltage V 113 may be used to tune optical device 101 to offset for any manufacturing errors in case for example the length of the coupling region 111 is slightly off.

In operation the optional voltage V 113 is applied through electrodes 115 and 117 to waveguides 105 and 107 to control an electric field across insulating region 109 to control the charge layers proximate to insulating region 109 in coupling region 111. In one embodiment, electrodes are electrically connected to first and second optical waveguides 105 and 107 at locations outside the optical path of optical beam 119. In one embodiment, a capacitive structure is defined in the coupling region 111 of semiconductor material 103 with insulating region 109 separating the charge layers proximate to insulating region 109 in first and second waveguides 105 and 107.

Figure 2:
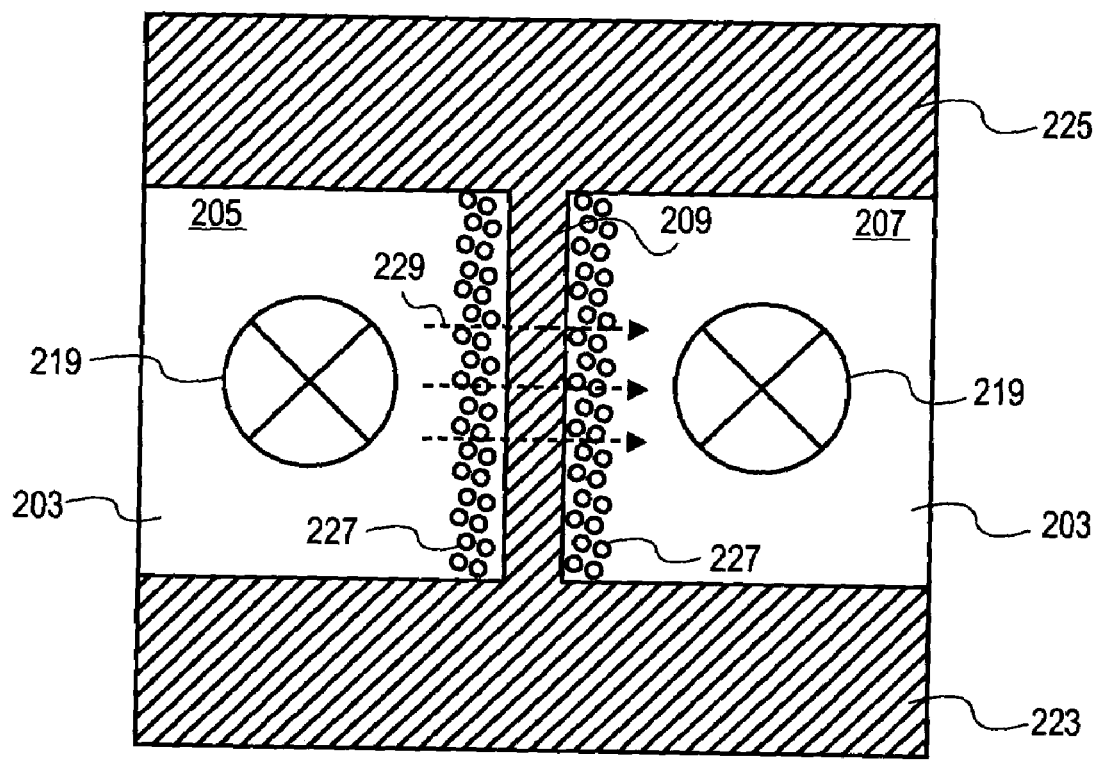
FIG. 2 is a cross-section diagram through a coupling region of one embodiment of a polarization beam splitter/combiner in accordance with the teachings of the present invention.

FIG. 2 is a cross-section illustration of an embodiment of an optical device 201, which represents a cross-section illustration along dashed line A–A' 121 of FIG. 1 through coupling region 111 of optical device 101. As shown in the depicted embodiment, optical device 201 includes a semiconductor material layer 203 disposed between an insulating region 223 and an insulating region 225. In one embodiment, optical device 201 is included in a silicon-on-insulator (SOI) type of wafer and insulating region 223 is the buried oxide layer of the SOI wafer. FIG. 2 also shows that in an embodiment semiconductor material layer 203 includes an insulating region 209 separating a first optical waveguide 205 and a second optical waveguide 207.

As shown, charge layers 227 are formed proximate to insulating region 209 in an embodiment. Depending on the doping included in first and second optical waveguides 205 and 207, charge layers 227 may include electrons, holes or a combination thereof. In addition, optical device may be biased to operate in accumulation mode, inversion mode or depletion mode. It is appreciated that a capacitive structure is defined with charge layers 227 forming the "plates" of a capacitor separated by insulating region 209.

In operation, an optical beam 219 may be launched or directed into first optical waveguide 205. Optical beam 219 is illustrated in FIG. 2 going through the page. When optical beam 219 propagates next to insulating region 209, an evanescent coupling 229 occurs through insulating region 209 such that optical beam 219 propagates from first optical waveguide 205 to second optical waveguide 207. In one embodiment, the effective index of refraction through insulating region 209 is modulated in response to charge layers 227. Therefore, the coupling strength of the evanescent coupling 229 may be tuned or adjusted in one embodiment in response to the charge carriers in charge layers 227. In one embodiment, the free charge carrier concentration in charge layers 227 is responsive to the applied voltage signal, such as for the voltage V 113 of FIG. 1.

Figure 3A:
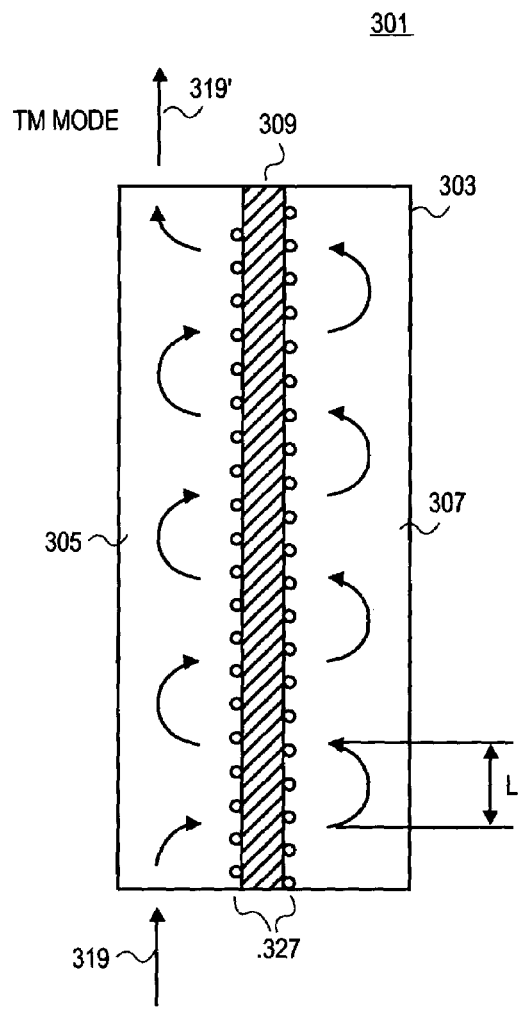
FIG. 3A is an illustration showing an evanescent coupling of a first polarization mode of an optical beam through an insulating region between waveguides of one embodiment of a polarization beam splitter/combiner in accordance with the teachings of the present invention.
Figure 3B:
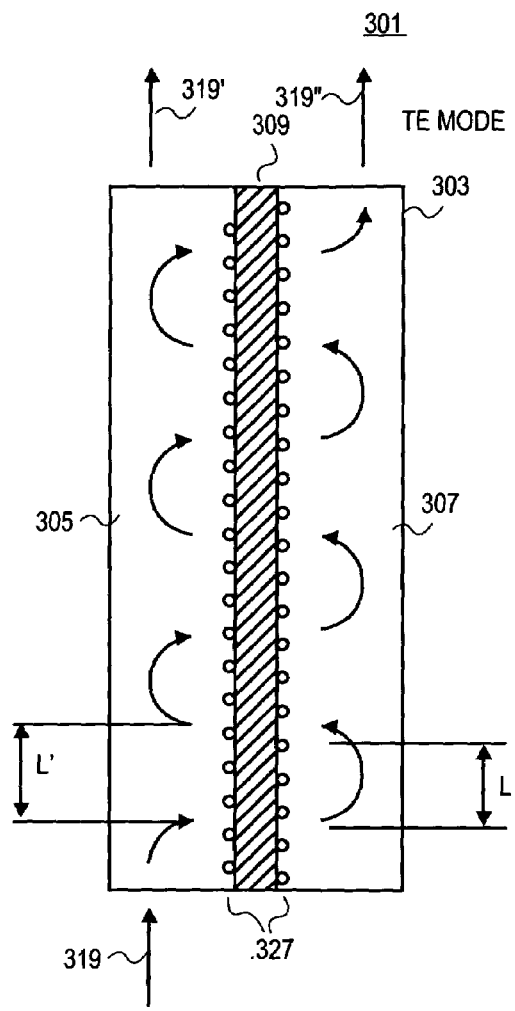
FIG. 3B is an illustration showing an evanescent coupling of a second polarization mode of an optical beam through an insulating region between waveguides of one embodiment of a polarization beam splitter/combiner in accordance with the teachings of the present invention.

To illustrate the different evanescent coupling lengths or strengths for the TM and TE mode components of an optical beam through the coupling region, FIGS. 3A and 3B are illustrations of one embodiment of an optical device 301 including a semiconductor material layer 303 having a first optical waveguide 305 and a second optical waveguide 307 separated by insulating region 309. It is appreciated that one embodiment of optical device 301 corresponds to the coupling region 111 of optical device 101 in FIG. 1.

In operation, an unpolarized optical beam 319 is launched or directed into first optical waveguide 305. When optical beam 319 propagates into the coupling region, the TM mode component 319' of optical beam 319 is evanescently coupled back and forth between the first and second waveguides 305 and 307 with a coupling length of L as shown in FIG. 3A. Similarly, the TE mode component 319" of optical beam 319 is evanescently coupled back and forth between the first and second waveguides 305 and 307 with a coupling length of L' as shown in FIG. 3B. It is appreciated of course that the lengths of L and L' as illustrated in FIGS. 3A and 3B are not necessarily to scale and are shown for explanation purposes. In one embodiment, the length of the coupling region 111 is appropriately sized such that the TM and TE modes are separated. As illustrated, the TM component 319' is directed out from the coupling region 111 through optical waveguide 305 and the TE mode component 319" is directed out from the coupling region 111 through optical waveguide 307. In one embodiment, charge layers 327 may be optionally employed to tune or adjust coupling region 111 in the event that there are any manufacturing errors in optical device 301. In one embodiment, the optical beam 319 may propagate bi-directionally through optical device 301 in accordance with the teachings of the present invention. It is appreciated that in another embodiment, another optical beam may also be launched or directed into second optical waveguide 307 and that optical device 301 may therefore receive an optical beam at either or both inputs. In one embodiment, optical beam 319 includes infrared or near infrared light or any other suitable wavelength of light that may propagate through semiconductor material layer 303.

Figure 4:
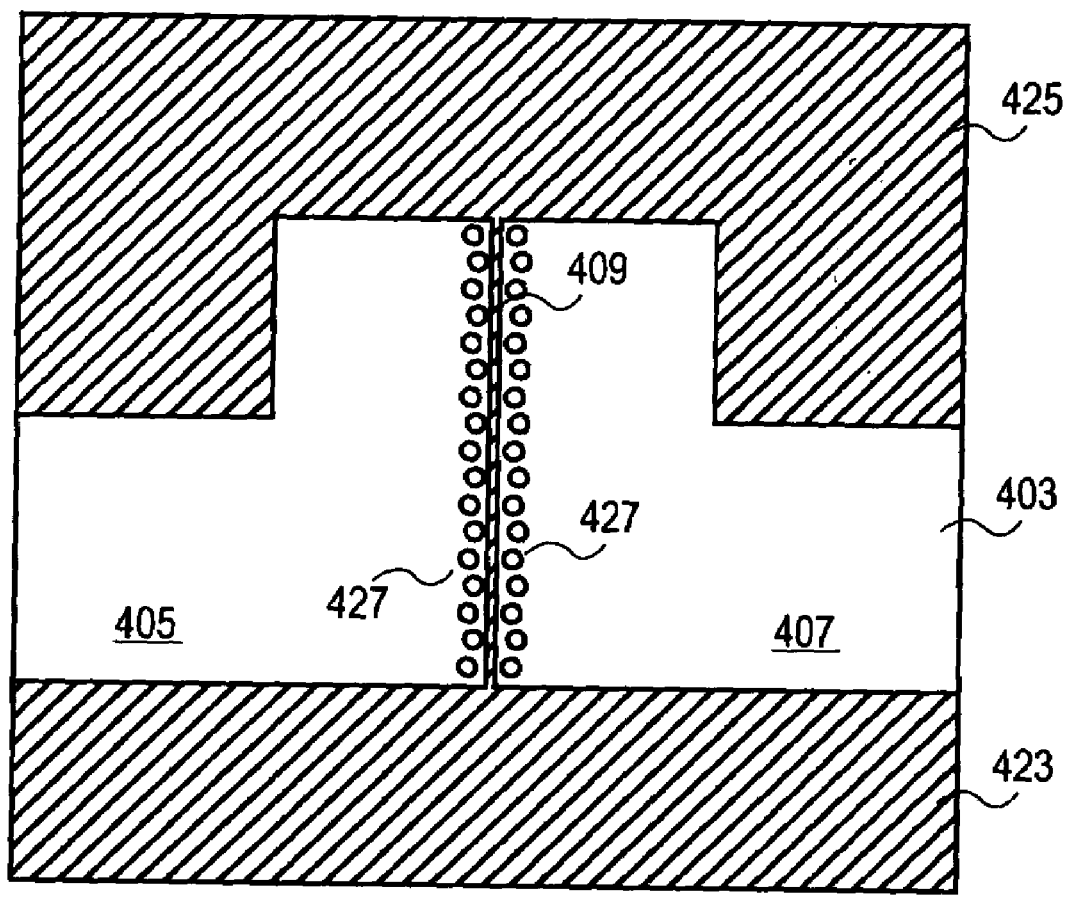
FIG. 4 is another cross-section diagram through the coupling region of one embodiment of a polarization beam splitter/combiner in accordance with the teachings of the present invention

FIG. 4 provides another cross-section illustration of one embodiment of an optical device 401 in accordance with the teachings of the present invention. In one embodiment, the cross-section illustration in FIG. 4 also represents a cross-section illustration along dashed line A–A' 121 of FIG. 1 through coupling region 111 of optical device 101. As illustrated in FIG. 4, optical device 401 includes a semiconductor material layer 403 disposed between an insulating region 423 and an insulating region 425. In one embodiment, optical device 401 is included in an SOI wafer and insulating region 423 is the buried oxide layer of the SOI wafer. FIG. 4 also shows that in an embodiment semiconductor material layer 403 includes an insulating region 409 separating a first optical waveguide 405 and a second optical waveguide 407. As shown, optional charge layers 427 are formed proximate to insulating region 409 in an embodiment to control or adjust the coupling strength between adjacent neighboring first and second optical waveguides 405 and 407. In one embodiment, the cross-section portion of optical device 401 may be characterized as a two mode waveguide in which an insulating region 409 is inserted in the middle, which therefore vertically isolates the two halves of the two mode waveguide. In the alternative, the cross-section portion of optical device 401 may also be characterized as two single mode asymmetric waveguides separated by a thin layer of oxide. Indeed, as shown in the illustrated embodiment, an optical rib waveguide is formed in the coupling region with insulating region 409 separating first and second optical waveguides 405 and 407.

In one embodiment, insulating region 409 is made of silicon oxide and is approximately 200 angstroms thick. It is appreciated of course that other suitable materials and that other suitable thicknesses and geometries may be utilized in accordance with the teachings of the present invention. Indeed, it is appreciated that device dimensions may be reduced considerably in accordance with the teachings of the present invention with improved lithographic and processing conditions and technologies. When an electric field is applied across insulating region 409, with for example voltage V 113 of FIG. 1, the two layers of charge layers 427 form on each side of insulating region 409. As a result, the effective index of refraction across insulating region 409 is reduced, which effectively introduces a stronger isolation or reduces the coupling strength between first and second optical waveguides 405 and 407. This in turn alters the coupling length L to L' as illustrated for example in FIGS. 3A and 3B.

Figure 5:
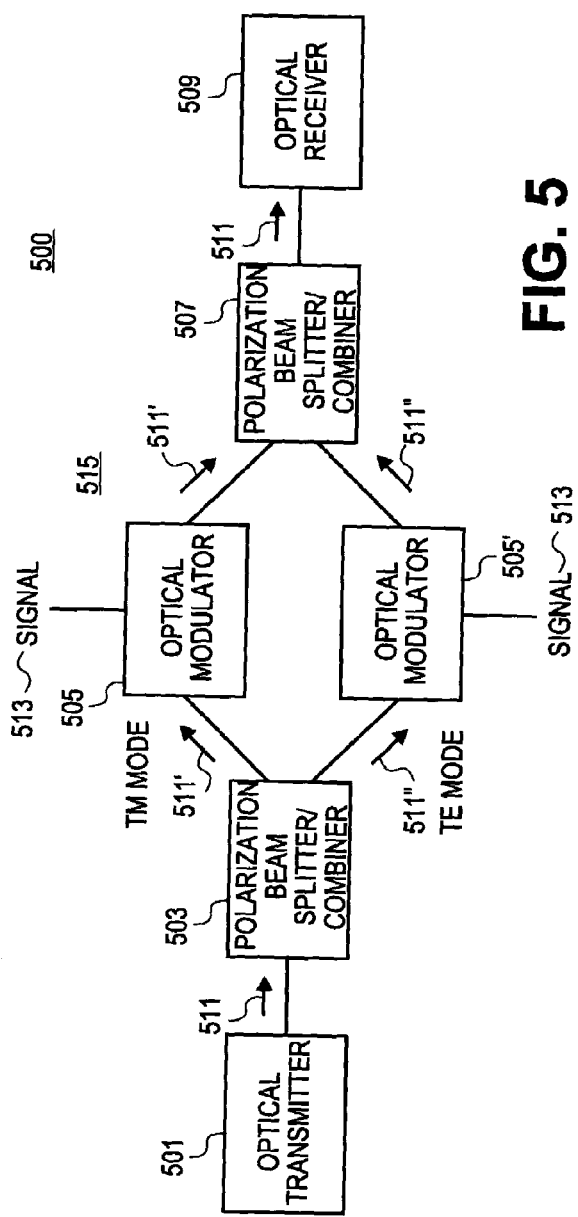
FIG. 5 is a block diagram illustration of a system including optical devices employed in a polarization insensitive optical modulator according to embodiments of the present invention.

FIG. 5 is a block diagram illustration of a system 500 including optical devices employed in a polarization insensitive optical modulator according to embodiments of the present invention. In the depicted embodiment, system 500 includes an optical transmitter 501, which outputs an optical beam 511. It is appreciated that it does not matter if optical beam 511 is unpolarized or becomes unpolarized for whatever reason because the presently described optical modulator embodiment is polarization insensitive in accordance with the teachings of the present invention.

Optical beam 511 is then received by polarization beam splitter/combiner 503, which separates a TM mode component 511' of optical beam 511 from a TE mode component 511" of optical beam 511. As shown, the TM mode component 511' is directed into an optical modulator 505 and the TE mode component 511" is directed into an optical modulator 505'. In the depicted embodiment, optical modulator 505 is coupled to modulate TM mode component 511' in response to a signal 513. Similarly, optical modulator 505' is coupled to modulate TE mode component 511" in response to signal 513 as well. Accordingly, a modulated TM mode component 511' is directed from optical modulator 505 to polarization beam splitter/combiner 507 and a modulated TE mode component 511" is directed from optical modulator 505' to polarization beam splitter/combiner 507. In accordance with the teachings of the present invention, polarization beam splitter/combiner 507 then combines the modulated TM and TE mode components 511' and 511" into a modulated optical beam 511, which is then received by optical receiver 509.

In one embodiment, polarization beam splitters/combiners 503 and 507 are substantially similar to the optical devices discussed above in connection with FIGS. 1–4. In one embodiment, polarization beam splitters/combiners 503 and 507 as well as optical modulators 505 and 505' are all disposed in the same semiconductor material layer 515. Accordingly, it is appreciated that the polarization insensitive optical modulator described above may be very small and integrated into for example a single silicon substrate. As a result, the device is very easy to process and manufacture in accordance with the teachings of the present invention.

Figure 6:
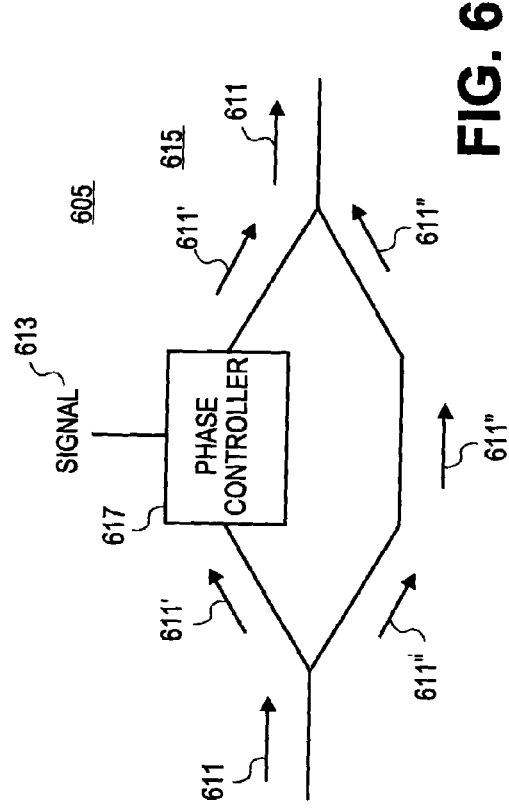
FIG. 6 is a block diagram illustrating one embodiment of an optical modulator utilized in accordance with the teachings of the present invention.

FIG. 6 is a block diagram illustrating one embodiment of an optical modulator 605 that may be utilized for optical modulator 505 or 505' in the polarization insensitive optical modulator discussed above in FIG. 5. As shown in the depicted embodiment, optical modulator 605 includes a Mach Zehnder interferometer (MZI) configuration disposed in semiconductor material layer 615. The MZI configuration includes an input optical waveguide in which an optical beam 611 is directed. Optical beam 611 is then split into optical beams 611' and 611", each of which is directed into the two respective arms of the MZI configuration. As shown in the depicted embodiment, at least one of the arms of the MZI configuration includes a phase controller 617, which is employed to adjust in response to signal 613 the phase of the optical beam that is propagated through the corresponding arm of the MZI configuration.

In another embodiment, it is appreciated that both arms of the MZI configuration may include a separate phase controller. In operation, phase controller 617 is employed to adjust a relative phase difference between optical beams 611' and 611" in response to signal 613 such that constructive or destructive interference occurs when optical beams 611' and 611" are recombined. As a result, modulated optical beam 611 is then directed away from the MZI configuration as shown in FIG. 6.

Various embodiments may be employed to realize phase controller 617, which is disposed in semiconductor material layer 615. In one embodiment, phase controller 617 includes a metal oxide semiconductor (MOS) capacitor structure to modulate charge in response to signal 613 along the optical path of optical beam 611'. The modulated charge is adapted to adjust the index of refraction along the optical path of optical beam 611', which adjusts the phase of optical beam 611'. It is appreciated of course that other techniques may be utilized for phase controller 617 to adjust the phase including for example known charge modulation, current injection or thermal phase adjustment techniques.

Figure 7:
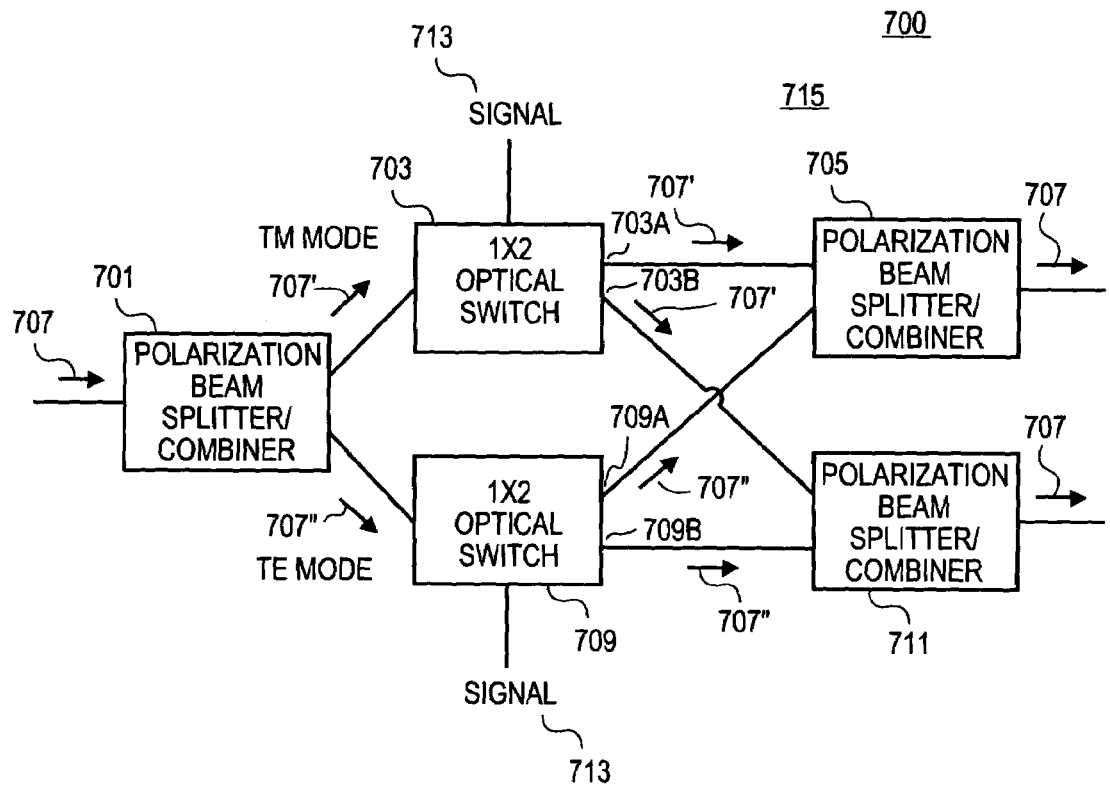
FIG. 7 is a block diagram illustration of a polarization insensitive 1×2 optical switch according to embodiments of the present invention.

FIG. 7 is a block diagram illustration of a polarization insensitive 1×2 optical switch 700 according to embodiments of the present invention. In the depicted embodiment, polarization insensitive 1×2 optical switch 700 includes a polarization beam splitter/combiner 701, which is coupled to receive an optical beam 707. It is appreciated that it does not matter if optical beam 707 is unpolarized or becomes unpolarized for whatever reason because the presently described 1×2 optical switch embodiment is polarization insensitive in accordance with the teachings of the present invention.

As shown in the depicted embodiment, polarization beam splitter/combiner 701 then separates a TM mode component 707' of optical beam 707 from a TE mode component 707" of optical beam 707. As shown, the TM mode component 707' is directed into a 1×2 optical switch 703 and the TE mode component 707" is directed into a 1×2 optical switch 709. In the depicted embodiment, 1×2 optical switch 703 switches TM mode component 707' to either output 703A or 703B of 1×2 optical switch 703 in response to a signal 713. Similarly, 1×2 optical switch 709 switches TE mode component 707" to either output 709A or 709B of 1×2 optical switch 709 in response to a signal 713 as well.

As shown in the depicted embodiment, assuming outputs 703A and 709A were selected by signal 713, polarization beam splitter/combiner 705 is coupled to receive the TM and TE mode components 707' and 707" from outputs 703A and 709A, respectively. In accordance with the teachings of the present invention, polarization beam splitter/combiner 705 then combines the TM and TE mode components 707' and 707" and then outputs optical beam 707 as shown in the top right corner of FIG. 7.

Similarly, assuming outputs 703B and 709B were instead selected by signal 713, polarization beam splitter/combiner 711 is coupled to receive the TM and TE mode components 707' and 707" from outputs 703B and 709B, respectively. In accordance with the teachings of the present invention, polarization beam splitter/combiner 711 then combines the TM and TE mode components 707' and 707" and then outputs optical beam 707 as shown in the bottom right corner of FIG. 7.

In one embodiment, polarization beam splitters/combiners 701, 705 and 711 are substantially similar to the optical devices discussed above in connection with FIGS. 1–4. In one embodiment, polarization beam splitters/combiners 701, 705 and 711 as well as 1×2 optical switches 703 and 709 are all disposed in the same semiconductor material layer 715. Accordingly, it is appreciated that the polarization insensitive 1×2 optical switch described above may be very small and integrated into for example a single silicon substrate. As a result, the device is very easy to process and manufacture in accordance with the teachings of the present invention.

Figure 8:
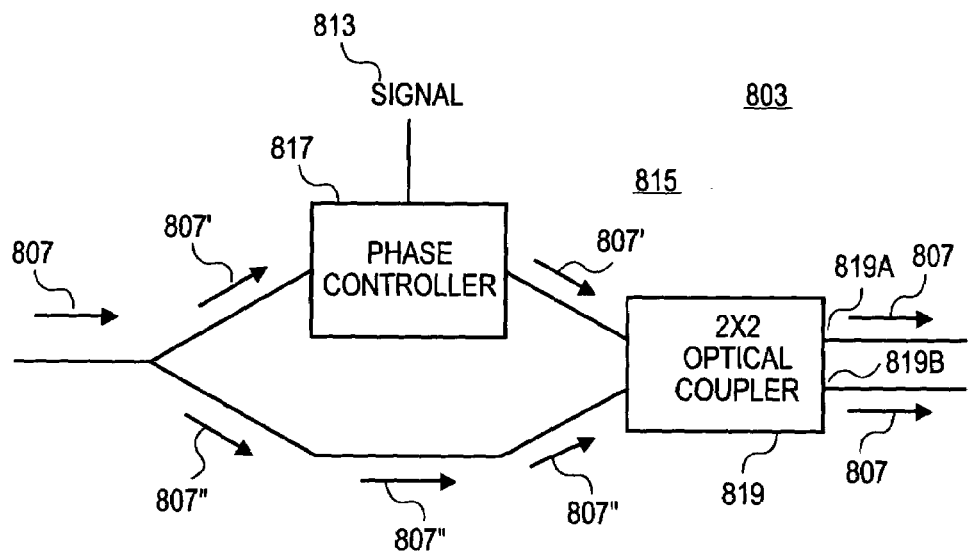
FIG. 8 is a block diagram illustrating one embodiment of 1×2 optical switch utilized for each polarization mode of an optical beam in accordance with the teachings of the present invention.

FIG. 8 is a block diagram illustrating one embodiment of 1×2 optical switch 803, which may be utilized for 1×2 optical switches 703 and 709 of FIG. 7 in accordance with the teachings of the present invention. As shown in the depicted embodiment, 1×2 optical switch 803 includes a MZI configuration disposed in semiconductor material layer 815. The MZI configuration includes an input optical waveguide in which an optical beam 807 is directed. Optical beam 807 is then split into optical beams 807' and 807", each of which is directed into the two respective arms of the MZI configuration. As shown in the depicted embodiment, at least one of the arms of the MZI configuration includes a phase controller 817, which is employed to adjust in response to signal 813 the phase of the optical beam that is propagated through the corresponding arm of the MZI configuration.

In another embodiment, it is appreciated that both arms of the MZI configuration may include a separate phase controller. In operation, phase controller 817 is employed to adjust a relative phase difference between optical beams 807' and 807" in response to signal 813. As shown in the depicted embodiment, optical beams 807' and 807" are each received by 2×2 optical coupler 819. In one embodiment, 2×2 optical coupler 819 includes a multi-mode interference (MMI) device. In another embodiment, 2×2 optical coupler 819 may include another suitable type of optical coupler such as for example an evanescent coupler, which includes for example two waveguides that are positioned very close to each other so that the transfer of light occurs between the waveguides before the waveguides are again separated.

In operation, the 2×2 optical coupler 819 receives both optical beams 807' and 807". Depending on the relative phase difference between optical beams 807' and 807" as controlled by phase controller 817, a combined optical beam 807 is output from either the first output 819A or the second output 819B of 2×2 optical coupler 819. For example, in one embodiment, if the relative difference between optical beams 807' and 807" is pi/2, then combined optical beam 807 is output from output 819A. However, if the relative difference between optical beams 807' and 807" is −pi/2, then combined optical beam 807 is output from output 819B.

Similar to phase controller 617 of FIG. 6, various embodiments may be employed to realize phase controller 817, which in one embodiment is integrated in the same semiconductor material layer 815 as 2×2 optical coupler 819. In one embodiment, phase controller 817 includes a MOS capacitor structure to modulate charge in response to signal 813 along the optical path of optical beam 807'. The modulated charge is adapted to adjust the index of refraction along the optical path of optical beam 807', which adjusts the phase of optical beam 807'. It is appreciated of course that other techniques may be utilized for phase controller 817 to adjust the phase including for example known charge modulation, current injection or thermal phase adjustment techniques.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a first polarization beam splitter/combiner through which an optical beam is to be directed;
   a first 1×2 optical switch coupled to the first polarization beam splitter/combiner to receive a first polarization mode of the optical beam;
   a second 1×2 optical switch coupled the first polarization beam splitter/combiner to receive a second polarization mode of the optical beam;
   a second polarization beam splitter/combiner coupled to a first output of the first 1×2 optical switch and coupled to a first output of the second 1×2 optical switch, the second polarization beam splitter coupled to combine the first and second polarization modes of the optical beam received from the respective first outputs of the first and second optical switches; and
   a third polarization beam splitter/combiner coupled to a second output of the first 1×2 optical switch and coupled to a second output of the second 1×2 optical switch, the third polarization beam splitter coupled to combine the first and second polarization modes of the optical beam received from the respective second outputs of the first and second optical switches, the first, second and third polarization beam splitters and the first and second 1×2 optical switches disposed in a semiconductor material layer.

2. The apparatus of claim 1 wherein each of the first, second and third polarization beam splitters/combiners comprises:
   a first optical waveguide disposed in the semiconductor material layer;
   a second optical waveguide disposed in the semiconductor material layer; and
   a insulating region disposed between the first and second optical waveguides to provide a coupling region in the semiconductor material layer between the first and second optical waveguides, the coupling region having a first coupling length for the first polarization mode of the optical beam directed through one of the first and second optical waveguides into the coupling region, the coupling region having a second coupling length for a second polarization mode of the optical beam.

3. The apparatus of claim 2 wherein each of the first, second and third polarization beam splitters/combiners further comprises modulated charge layers proximate to the insulating region in the coupling region to adjust the first and second coupling lengths.

4. The apparatus of claim 1 wherein each of the first and second 1×2 optical switches comprises:
   a Mach Zehnder interferometer (MZI) configuration coupled to receive the respective first or second polarization mode of the optical beam, the MZI configuration including first and second arms;
   a phase controller in at least one arm of the MZI configuration to control a relative phase difference between the first and second arms of the MZI configuration; and
   a 2×2 optical coupler coupled to the first and second arms of the MZI configuration.

5. The apparatus of claim 4 wherein the 2×2 optical coupler of each of the first and second 1×2 optical switches comprises a 2×2 multi-mode interference (MMI) device.

6. The apparatus of claim 4 wherein the 2×2 optical coupler of each of the first and second 1×2 optical switches comprises a 2×2 evanescent coupler.

* * * * *